United States Patent [19]

Adams

[11] Patent Number: 4,962,857
[45] Date of Patent: Oct. 16, 1990

[54] SWARM LURE PACKAGE

[76] Inventor: John Q. Adams, 1206 Foxcroft Rd., Richmond, Va. 23229

[21] Appl. No.: 446,597

[22] Filed: Dec. 6, 1989

[51] Int. Cl.5 .............................................. B65D 85/08
[52] U.S. Cl. ........................................ 206/443; 43/55; 426/1; 449/27
[58] Field of Search ................... 449/3, 27, 48; 43/55, 43/122; 426/1; 206/442, 443, 344, 345, 616, 343

[56] References Cited

U.S. PATENT DOCUMENTS

| 35,902 | 7/1862 | Sturtevant | 206/345 |
|---|---|---|---|
| 1,384,377 | 7/1921 | Ault | 449/27 |
| 2,827,376 | 3/1958 | Breuer | 426/1 |
| 2,895,829 | 7/1959 | Feo et al. | 426/1 |
| 3,047,975 | 8/1962 | Pretorius | 426/1 |
| 3,764,351 | 10/1973 | Whittington et al. | 206/443 |
| 3,802,987 | 4/1974 | Noll | 206/345 |
| 3,854,234 | 12/1974 | Hardin | 426/1 |
| 3,861,526 | 1/1975 | Leistner | 206/344 |
| 4,341,800 | 7/1982 | Lester | 426/1 |
| 4,465,185 | 8/1984 | Sur | 206/616 |

Primary Examiner—Paul J. Hirsch
Attorney, Agent, or Firm—N. J. Aquilino

[57] ABSTRACT

A swarm lure package formed of a plurality of individual swarm lure units. The units are elongated tubes and are filled with swarm attracting material. A common end pack material closes the ends of each of the individual swarm lure units to form a single integral package. The end pack material permits removal of individual ones of the units while maintaining the remaining units in an integral package.

7 Claims, 1 Drawing Sheet

SWARM LURE PACKAGE

BACKGROUND OF THE INVENTION

The present invention relates to an insect lure package, and more particularly to a package containing a plurality of insect lures for use with bait hives.

The raising of bees and other insects often requires capturing of a swarm from the wild which then can be cared for and cultivated in captivity. In order to induce a swarm of bees into a bait hive, it is necessary to use some type of lure or pheromone to attract the bees. Various ways of using lures have been utilized over the centuries from rubbing certain plants within a bait hive to enclosing pheromone inside a wax or polyethylene cavity which is placed in a bait hive, or simply by dispensing the pheromone in the form of a paste from a tube into a bait box. When using single containers of lure out in a field, it often becomes unwieldy because of leakage, breaking of the lures, and the like.

The present invention provides a package of a plurality of lure containers which can be carried together to facilitate handling, storage, and to minimize the leakage of the lure material out of the individual containers. The invention uses a plurality of polyethylene tubes which may be porous or non-porous which holds the pheromone paste for attracting the desired insects. End caps formed of wax or other similar material are used to seal the ends of each of the container tubes. Since the container tubes are held together, the sealing may be done with a single application. Each container tube may be held together by a substance that permits individual ones of the container tubes to be broken or torn away when a lure is needed. Because each of the container tubes are held next to another, the surface area through which the pheromone can be dispersed is lessened and held within the tube until it is ready for release in a bait hive.

In the field, individual lures can be separated from the package by using a pen knife, or simply by tearing away individual units as needed.

Among the objects of the present invention are the provision of a package of insect attracting lures providing a plurality of individual container tubes which are easy to transport and handle and which permit individual ones of the container tubes to be used selectively as needed.

DESCRIPTION OF PREFERRED EMBODIMENTS

Figure 1:
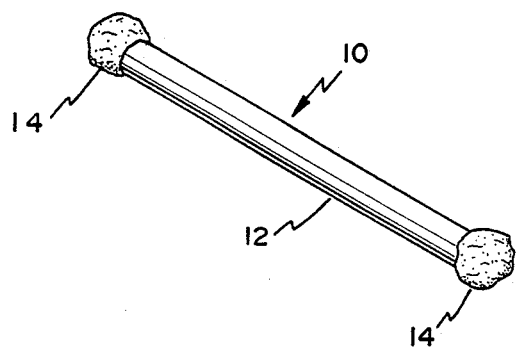
FIG. 1 illustrates a single swarm lure of the type used with the present invention.
Figure 2:
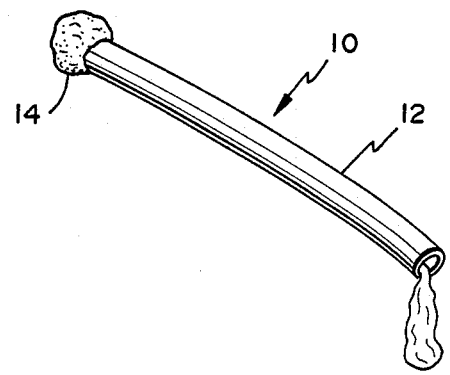
FIG. 2 shows the lure of FIG. 1 with the end cap removed.

FIG. 1 shows a single swarm lure 10 formed of a porous or non-porous polyethylene tube 12 which holds the pheromone paste for attracting the bees or other insects. The lure 10 includes end caps 14 placed over the ends of the tube to retard the lure material from escaping. FIG. 2 shows the lure of FIG. 1 with one of the end caps 14 removed, and the lure material 16 exuding out of the end of tube 12. When a swarm lure of this type is normally used, either one or both end caps are removed and with suitable pressure, a small amount of the lure material is forced out of the end of the tube. This material is spread on the front entrance to the bait hive. The remaining lure material within the tube is placed inside the hive so that the lure material seeps through the sides or out of the ends of the tubing to attract the bees or other insects.

Figure 3:
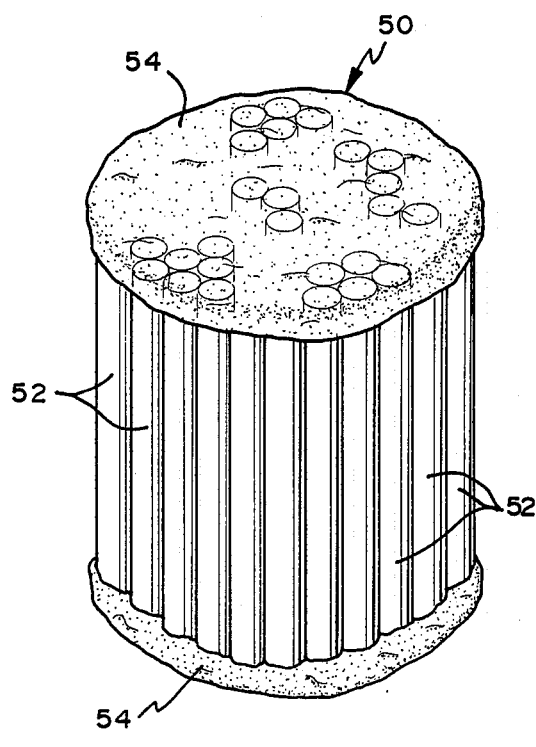
FIG. 3 illustrates a swarm lure package of the present invention.

FIG. 3 illustrates the swarm lure package 50 of the present invention. The package is composed of a plurality of porous or non-porous polyethylene tubes 52 each containing pheromone paste for attracting the desired insects. The tubes are clustered together, and may be adhered by a suitable adhesive material. End caps 54, made of wax or other materials, are applied to each of the ends of the tubes simultaneously so that a single application of end cap wax seals all of the ends of the various tubes 52. This not only provides a generally uniform distribution of end cap material, but greatly facilitates the making of swarm lures since each tube does not have to be kept individually. It will be appreciated that one end of the tube is capped, the lure material added to each of the tubes, and subsequently a second end cap layer applied to seal each of the tubes.

Figure 4:
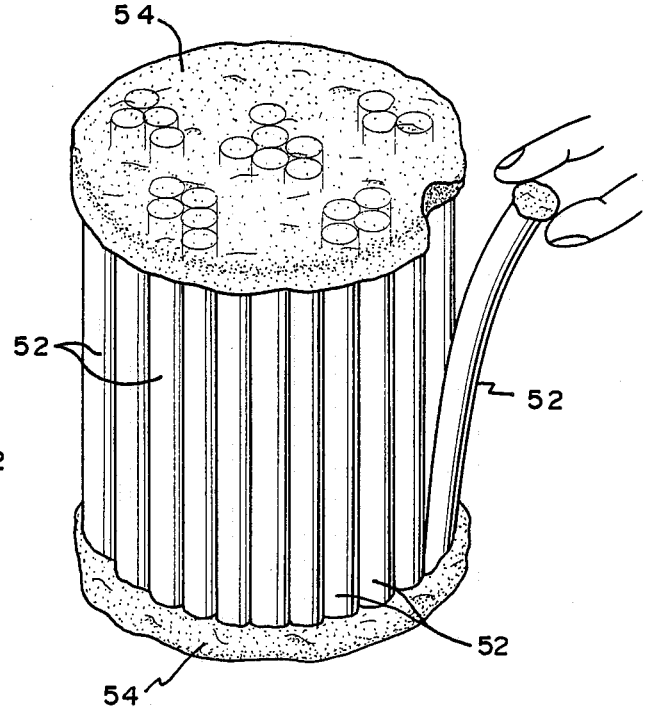
FIG. 4 illustrates a swarm lure package with a single lure being removed.

In use in the field, the swarm lure package can be easily handled, and since each of the swarm lure tubes are attached, they do not become readily misplaced, or lost or damaged in the field. When one or more of the individual swarm lures is to be used, it becomes a simple matter to tear individual ones away from the package either by hand (see FIG. 4), or using a small pen knife, or the like. Once the individual units are removed from the package, they can be used as described hereinabove with respect to the single swarm lures as shown in FIGS. 1 and 2. Because the individual lures are held next to each other, the surface area exposed to the ambient air is lessened, thereby resulting in more of the pheromone being held within the tube until it is ready for release. This is particularly true if the tubing is porous, which permits a user to maintain a fairly large supply of swarm lures without the necessity of having to use them up quickly because of seepage of the lure material.

It is understood that the forms of the invention described and shown hereinabove are preferred examples, and that various changes and modifications may be made without departing from the spirit and scope of the present invention as defined in the following claims.

I claim:

1. A swarm lure package comprising a plurality of individual swarm lure units, said units including swarm attracting material being contained therein and a common end pack material closing the ends of each of the said individual swarm lure units forming an integral package thereby, said end pack material permitting removal of individual ones of said units while maintaining the integrity of the package of the remaining units.

2. The swarm lure package of claim 1 wherein said individual units are formed of elongated tubes formed in a cluster, and attached with each of the ends of the individual units juxtaposed.

3. The swarm lure package of claim 2 wherein said elongated tubes include open ends to receive said swarm attracting material.

4. The swarm lure package of claim 3 wherein said tubes are made of porous polyethylene.

5. The swarm lure package of claim 3 wherein said tubes are made of non-porous polyethylene.

6. The swarm lure package of claim 1 wherein said end pack material is wax.

7. The swarm lure package of claim 2 further including an adhesive substance adhering individual ones of said swarm lure units together along the longitudinal surface thereof.

* * * * *